Patented Jan. 16, 1951

2,537,950

UNITED STATES PATENT OFFICE 2,537,950

PREPARATION OF SUBSTITUTED DIAMINO-STILBENES FROM PINACOLS

Milton J. Allen, Baltimore, Md., assignor to the United States of America as represented by the Administrator of the Federal Security Agency No Drawing. Application November 5, 1948, Serial No. 58,631

1 Claim. (Cl. 260—578)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of alpha, beta-di-p-aminophenyl-alpha-beta dialkyl ethylene (otherwise known as alpha-beta substituted-4, 4'-diaminostilbenes). More particularly, this invention relates to the preparation of alpha, beta-dimethyl-4, 4'-diaminostilbene and the dihydrochloride salt thereof.

This invention has for an object the preparation of alpha-beta substituted 4, 4'-diaminostilbenes. Another object of this invention is to prepare alpha-beta substituted 4, 4'-diaminostilbenes from bis-(para-aminophenyl) alkyl ethylene glycols. A further object is to provide a process for the preparation of the above novel stilbene compounds which is simple in operation and capable of giving high yields. Another object is to prepare a new compound, alpha, beta-dimethyl-4, 4'-diaminostilbene. Another object is to prepare novel stilbene compounds capable of forming water-soluble salts having estrogenic activity. Further objects will be apparent as the ensuing description proceeds.

The foregoing objects are accomplished in accordance with this invention which provides alpha, beta-dialkyl 4, 4'-diaminostilbenes by treating bis-(p-aminophenyl) alkyl ethylene glycol salts with water to yield gamma-oxo-beta, gamma-(di-para-aminophenyl)-beta-alkyl alkane salts, then reducing the said oxo compounds to yield beta, gamma-di-(para-aminophenyl)-beta-alkyl-gamma hydrols, dehydrating the said hydrols to yield alpha, beta-dialkyl-4,4'-diaminostilbene salts, and liberating the free bases by treatment with an alkali, then separating and recovering the produced free bases.

In one preferred embodiment alpha, beta-dimethyl-4, 4'-diaminostilbene is produced by carrying out the above mentioned reaction steps employing as a raw material bis-(para-aminophenyl) methyl ethylene glycol dihydrochloride.

As starting materials, there are employed the bis-(para-aminophenyl) alkyl ethylene glycol salts, preferably dihydrochlorides, which can readily be prepared by electrolytic bimolecular reduction of para aminophenyl alkyl ketones as disclosed in my co-pending application, Serial Number 58,630, filed on concurrent date herewith.

While this invention is not limited by any particular theory of reaction, the following mechanism seems to fit the reaction and accords with all the facts now known. The dihydrochloride or other salt of bis-(para-aminophenyl) alkyl ethylene glycol having the following formula:

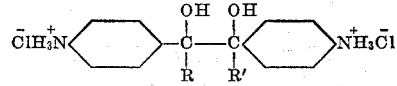

in which R and R' may be methyl, ethyl, propyl or other alkyl group is dissolved in a large excess of water, say ten to twenty parts by weight, and then either allowed to stand at room temperature for ten days or heated to boiling under a reflux condenser, for example, six to ten hours, preferably about eight hours. During the course of this treatment with water, a pinacol-pinacolone type rearrangement occurs to yield gamma-oxo-beta - gamma - (di - para - aminophenyl) - beta-alkyl a'kanes. Where the initial starting material was bis-(para-aminophenyl) methyl ethylene glycol dihydrochloride, there results from the water treatment gamma-oxo-beta, gamma-(di-para-aminophenyl)-beta-methyl propane dihydrochloride.

Following the conversion of the glycol to the oxo compound as above described, the oxo compound is then reduced or hydrogenated to the alcohol form. The conversion is thought to take place in accordance with the following equation:

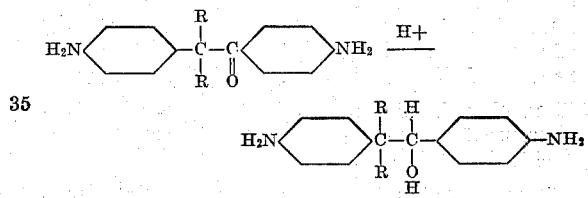

wherein R are alkyl radicals such as, for example, ethyl, propyl, or preferably methyl. A suitable reducing agent comprises metallic sodium in n-propyl alcohol although other reducing agents or mixtures yielding nascent hydrogen may be employed, for example, aluminum isopropoxide, or catalytic hydrogenation by Rainey nickel, nickel-Kieselguhr or the like. In the case of gamma-oxo-beta, gamma-di-(para-aminophenyl)-beta-methyl propane dihydrochloride reduced with anhydrous normal propyl alcohol and sodium metal, there results a new compound, beta, gamma di-(para-aminophenyl)-beta-methyl-gamma-propanol. The above produced alcohol resulting from the reduction is next dehydrated with subsequent rearrangement to yield the substituted stilbene compound. The dehydration and rearrangement yields the corresponding stilbene compound from the substituted alcohol. While any suitable dehydrating agent may be employed, such as, for example, dilute sulfuric acid, hydrobromic acid, acetyl chloride, or the like, it is preferred to employ a moderately concentrated hydrochloric acid solution, for example, 50% hydrochloric acid, since the resulting aminostilbene compound is thereby produced in the form of the dihydrochloride salt. In the case of beta, gamma - di - (para - aminophenyl) - beta - methyl-gamma-propanol, there results by dehydration a new compound, alpha, beta-dimethyl-4,4'-diaminostilbene. This compound is water soluble in the form of its dihydrochloride and has estrogenic properties. The conversion is thought to take place in accordance with the following equation:

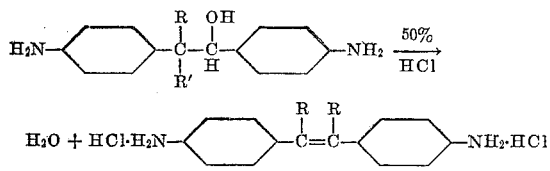

in which the R may be propyl ethyl and preferably methyl radicals. If desired, the dihydrochloride salt may be treated with dilute ammonium hydroxide, caustic soda or other alkali to liberate the free base. Upon liberation, the free base precipitates and is therafter recrystallized from methanol. Both the free base and the dihydrochloride salt are new compounds.

The following examples illustrate how the invention may be carried out, but it is not limited thereto:

*Example I.—Preparation of a-oxo-B,a-(di-p-aminophenyl) - B - methyl propane dihydrochloride*

2 grams of bis-(p-aminophenyl) methyl ethylene glycol dihydrochloride is dissolved in 25 ml. of water and allowed to stand at room temperature for approximately two weeks. The solution was then evaporated to dryness and the residue taken up in a small quantity of warm concentrated hydrochloric acid. Upon chilling and scratching or seeding, crystallization began and after standing in the refrigerator overnight, they were filtered off and washed with a 1:1 solution of absolute ethanol and ethyl acetate. The average yield is 62%; M. P. 270–273° C. (dec.).

*Example II.—Preparation of a-oxo-B,a-(di-p-aminophenyl) - B - methyl propane dihydrochloride*

2 grams of bis-(p-aminophenyl) methyl ethylene glycol dihydrochloride dissolved in 25 ml. of water is refluxed for eight hours. The compound is isolated and purified as in Example I, M. P. 270–273° C. (dec.). Yield 63%.

*Example III.—Preparation of B,a-di-(p-aminophenyl)-B-methyl-gamma-propanol dihydrochloride*

5 grams of a-oxo-B,a-di-(p-aminophenyl)-B-methyl propane dihydrochloride and 85 ml. of anhydrous n-propyl alcohol are heated to reflux. 5.5 grams of sodium are added over a period of approximately one hour. The reaction mixture is allowed to reflux for an additional hour. An excess of water is added to the mixture and most of the alcohol removed by vacuum distillation. The aqueous-oil mixture is chilled and then the water layer removed by decantation. The oil is washed with water and then extracted with ethanol. The ethanol solution is filtered and evaporated to a small volume. Concentrated hydrochloric acid is added and evaporation continued under reduced pressure until crystallization occurs. After chilling overnight the crystals are filtered and washed with a 1:1 solution of absolute ethanol and ethyl acetate. An 81.5% yield is obtained of dihydrochloride; M. P. 309–311° C. (dec.).

*Example IV.—Preparation of a-B-dimethyl-4,4'-diaminostilbene*

4.1 grams of B,adi - (p - aminophenyl) - B - methyl-a-propanol dihydrochloride are refluxed with 100 ml. of 50% hydrochloric acid for 2½ hours. The solution is chilled overnight and the crystals of dihydrochloride are collected and washed lightly with absolute ethanol. The yield is 75%. Decomposes at about 330° C.

The free base is prepared by dissolving the hydrochloride in water and making alkaline. The free base thus obtained is recrystallized from dilute methanol, M. P. 145–146° C. (dec.).

*Example V.—Preparation of a-B-dimethyl-4,4'-diaminostilbene*

11 grams of a-oxo-B,a-di-(p-aminophenyl)-B-methyl propane dihydrochloride is heated to reflux with 135 ml. of anhydrous n-propyl alcohol. 13.2 grams of sodium are then added portionwise over a period of two hours. Reflux is continued for an additional one hour. A solution of 90 ml. concentrated hydrochloric acid in 180 ml. of water is added to the alcoholic mixture and the contents distilled to a small volume and put in the refrigerator to crystallize. The crystals of the dihydrochloride are filtered. Yield is 74%. Decomposes at about 330° C. The dihydrochloride is dissolved in water and made alkaline with ammonium hydroxide. Upon evaporation, crystals of the free base are formed and then removed by filtration. The free base prepared as above has a melting point of 145–146° C. (dec.).

From the foregoing, it is apparent that there has been provided novel substituted diaminostilbenes and their salts. The said stilbene compounds possess utility as estrogens and in addition, their dihydrochlorides are water soluble, a marked advantage.

Since many apparently differing embodiments will occur to one skilled in the art, various changes can be made in the invention as illustrated and described without departing from its spirit and scope within the meaning of the appended claims as ultimately allowed.

What is claimed is:

A process for the production of alpha, beta-dimethyl-4,4'-diaminostilbene which comprises dissolving bis-(p-aminophenyl) methyl ethylene glycol dihydrochloride in water and heating the resulting solution until the said glycol is converted into gamma - oxo - beta - gamma (di-p-aminophenyl) beta - methyl - propane dihydrochloride, removing the water then dissolving the said oxo compound in normal propyl alcohol and treating the resulting solution with metallic sodium whereby the oxo radical is reduced, separating the reduced compound and admixing the same with dilute hydrochloric acid, then distilling off the hydrochloric acid and cooling and crystallizing the alpha, beta-dimethyl-4,4'-diamino stilbene dihydrochloride, neutralizing the same with aqueous ammonium hydroxide, and evaporating the neutralized solution to crystallize therefrom alpha, beta-dimethyl-4,4'-diamino stilbene.

MILTON J. ALLEN.

REFERENCES CITED

The following references are of record in the file of this patent:

FOREIGN PATENTS

| Number | Country | Date |
|---|---|---|
| 115,287 | Germany | Nov. 9, 1900 |

OTHER REFERENCES

Lucas et al., "Bull. Soc. Chim." (4), vol. 45, p. 718–734 (1929).

Vargha et al., "Ber. deut. Chem.," vol. 75, p. 794 to 802 (1942).

Index, "Chemical Abstracts," vol. 42, p. 10599 (1948).